3,567,643
HYDROTHERMAL PROCESS FOR GROWING CRYSTALS HAVING THE STRUCTURE OF BERYL IN AN ACID HALIDE MEDIUM
Edith M. Flanigen, Buffalo, and Norbert R. Mumbach, Eggertsville, N.Y., assignors to Union Carbide Corporation
No Drawing. Continuation-in-part of application Ser. No. 646,121, June 14, 1967, which is a continuation-in-part of application Ser. No. 345,562, Feb. 18, 1964. This application Mar. 25, 1968, Ser. No. 715,505
Int. Cl. B01j *17/00;* C04b *35/00*
U.S. Cl. 252—62.58                         9 Claims

ABSTRACT OF THE DISCLOSURE

A hydrothermal process for growing relatively large macro-crystals having the structure of beryl. Growth takes place on seed crystals from an acid medium which includes alkali metal and/or ammonium halides.

---

This application is a continuation-in-part of application Ser. No. 646,121, filed June 14, 1967 which is in turn a continuation of application Ser. No. 345,562, filed Feb. 18, 1964 and now abandoned.

This invention relates to a process for growing crystals having the structure of beryl. More particularly, it relates to a process for growing large single crystals having the structure of beryl of a size suitable for scientific and commercial uses from seeds in acidic aqueous media at elevated temperatures and pressures.

Beryl, which is the only ore of beryllium, is a crystal having the ideal composition $3.0BeO \cdot 1.0Al_2O_3 \cdot 6.0SiO_2$, and is commonly found in its natural form in granite. Its crystal structure is a hexagonal system, and it is usually found in the form of long, six-sided prisms. The framework of the crystal structure of beryl is a complex cyclosilicate ring structure in which the silicon atoms are at the centers of a group of four oxygen atoms lying at the points of tetrahedra. These tetrahedral groups are linked together by the sharing of oxygen atoms in the rings having the composition $Si_6O_{18}$. The silica rings are joined together by aluminum atoms lying in the center of a group of six oxygen atoms, and by berryillium atoms in a similar group of four oxygen atoms. There are two molecules in each unit cell. Beryl ranges in Moh's hardness from 7.5 to 8, and in specific gravity from 2.63 to 2.85.

In addition to pure beryl, there are crystallographic analogs of beryl which are also valuable for scientific and commercial uses. The structure of these analogs is essentially the same as that of beryl, except for the presence of small amounts of materials other than the oxides of beryllium, silicon and aluminum which are present. For example, when small amounts of aluminum are isomorphously replaced by chromium in the beryl crystal structure, a green crystallographic analog of beryl is obtained which has the essentially the same crystal structure of beryl. The product thus obtained is commonly known as emerald, although green gemstone emeralds do not necessarily always contain chromium.

When a metal ion other than those of aluminum, silicon and beryllium is incorporated in small amounts in the structure of beryl, the crystal which is thus obtained is commonly known in the art as a "doped" crystal. For example, when small amounts of chromium are incorporated in the crystal structure of beryl, the resulting emerald which is obtained could be considered to be a "chromium-doped" beryl. The ion thus incorporated in the crystal structure is usually referred to as a "dopant ion." For example, in the case of synthetically grown emerald or "chromium-doped" beryl the chromium which is incorporated in the synthetic crystal would be considered to be the "dopant" ion. Thus, the terms "doped" and "dopant" are well-known in the are and are intended to have the above defined and well known meanings whenever they appear hereafter in this application.

In recent years there has been an increased interest in the art of growing large synthetic crystals. Although initially this interest was stimulated by successes in growing synthetic crystals for use in the gemstone art (for example, synthetic ruby anud synthetic sapphire crystals, etc.) more recent developments in the physics and chemistry of the solid state have created a demand for synthetic crystals which may or may not also be of interest in the field of solid state applications (for example, large synthetic crystals of ruby or red corundum have been used successfully in maser and laser applications).

Although there are several general types of processes known for growing crystals (for example, the Verneuil or flame-fusion process, and the Czochralski method of crystallizing from a melt), these processes have inherent drawbacks for growing large synthetic crystals of beryl and beryl analogs. The two mentioned techniques are most often applied to growth of less complex systems and to crystals which melt congruently. The large thermal gradients which are inherent in these processes tend to induce strain, particularly in crystals of large size. A third method of growing single crystals is by the flux-melt method. The disadvantage which is ofen encountered in the flux-melt method is the incorporation within the crystal growth of the flux material or other undesirable impurities. By the hydrothermal synthesis of single crystals having the structure of beryl to be herein described, strain-free, high-quality, optically transparent materials may be more readily obtained; and the growth of relatively large synthetic macro-crystals having the structure of beryl can be achieved.

Although the hydrothermal process for crystal synthesis is known in the art as a general technique used in crystallization, the applicablility of this process depends to a great extent on the particular type of crystal which is being synthesized, the process conditions which are employed, and the compositions of the reactant mixture or medium from which crystallization is being attempted. The hydrothermal process of crystallization is generally understood to a mean a process wherein an aqueous solvent under high temperature and pressure is used to increase the insolubility of reactants to a point at which crystals of a material may be prepared. Much more difficult and unpredictable, however, is the application of hydrothermal techniques to the growth of single crystals of any size in a controlled manner. An article by R. A. Laudise in Progress in Inorganic Chemistry, vol. III, page 2 (1962) indicates that the utility of this process in preparing a particular type of crystal depends on the discovery of the proper set of conditions for crystal growth. Predictive ability is poor, and a complex series of criteria which may sometimes be mutually exclusive must be compromised before a single crystal can be grown. As further proof of the unpredictability of applying the known principles of the general process in an attempt to prepare a particular crystal, E. J. Gubelin in an article in Gems and Gemology, Winter 1960–1961, pp. 105–113, stated that "solvent, nutrient, temperature, pressure and foreign agents are only a few of the variable factors that may render the hydrothermal synthesis a hazardous gamble."

In the prior art there are some reference to hydrothermal processes for growing synthetic crystals having the structure of beryl, but none of these references teaches a satifactory method for growing synthetic crystals of beryl of any significant size. Although some of the hydrothermal methods for growing synthetic crystals of beryl structure which are known in the prior art give a general outline of the systems and conditions which were employed, most references to the prior art processes relating to crystals with beryl structure tend to be vague and highly speculative in nature.

In an article by G. Van Praagh entitled "Synthetic Quartz Crystals" which appeared in Geological Magazine, vol. 84, pp. 98–100 (1947), the author indicates that Professor R. Nacken of the Mineralogical Institute of Frankfurt University had some success in preparing synthetic crystals of emerald by a hydrothermal process. The process was apparently similar to his process for growing quartz, but the critical details of the process such as the specific mineralizers, nutrients and reaction conditions which were employed are not disclosed.

C. F. Chatham of San Francisco has been growing synthetic emeralds for commercial use in the gemstone field since 1935. Although the Chatham process has produced synthetic crystals of significant size and quality, the details of his process have also never been disclosed. Since Chatham first made his crystal products available to the art there has been a considerable amount of speculation by experts in the field as to the process which he employs, but details relating to the actual process are still unavailable at the present time. E. A. D. White in an article in Quarterly Reviews, vol. 15 (1961), pp. 1–29, hypothesized that Chatham's process was a hydrothermal process wherein crushed beryl was the nutrient, but details of the process were not given. Others have more recently suggested that the Chatham process is a flux-fusion process, and not the hydrothermal process that it was originally believed to be.

In addition to the Chatham synthetics discussed above, another emerald substitute which has recently appeared on the market is Lechleitner's "Emerita" stones. The details of the process used in preparing these stones have not been revealed, but these stones are apparently a product of a process wherein a thin synthetic emerald overgrowth or layer is applied to a relatively large faceted beryl seed. Gubelin has presented an hypothesis as to Lechleitner's process, indicating that this process may be analogous to Nacken's process for growing quartz, and that the synthesis of the emerald overgrowth is brought about in an alkaline medium under pressures of approximately 1000 atmospheres and at temperatures between 300 and 400° C. In contrast to Gubelin's hypothesis of Lechleitner's process, the work of Wyart and Scavnicar [Bull, Soc. franc, Miner Crist., LXXX, pp. 305–306 (1957)] indicated that the incorporation of trace amounts of $NaHCO_3$ to give a weakly alkaline medium did not improve their hydrothermal process for synthesizing micro-crystals of beryl, and that the presence of more than trace amounts of this alkali caused the formation of undesirable impurities such as albite and feldspar. Their attempts to dope their micro-crystals with chromium were inconclusive, since a number of undesirable impurities such as phenacite, quartz and chromium oxide were formed, and they were unable to determine if any chromium was actually incorporated into the micro-crystals which they obtained.

The principal object of the present invention is to provide a process for synthesizing single crystals having the structure of beryl, particularly beryl analogs doped with transition metal or rare earth metal ions.

Another object is to provide synthetic crystals of beryl structure, particularly those doped with transition metal or rare earth metal ions which are of a size suitable for use in the gemstone art and in solid-state devices.

Other and further objects and advantages of the present invention and the preferred embodiments thereof will become apparent and are disclosed in detail in the following description.

The present invention relates to a hydrothermal process for growing single crystals having the structure of beryl which comprises depositing a composition having the structure of beryl on a seed crystal from an aqueous reactant mixture which comprises (1) at least a major amount of (A) sources of oxides of beryllium, aluminum and silicon and (B) an acidic halide medium which comprises at least one member selected from the class consisting of alkali metal halides and ammonium halides and (2) a minor amount of (C) sources of ions of at least one metal selected from the class consisting of transition metals and rare earth metals as a dopant, said process being operated at a temperature of at least 425° C. and under a pressure of at least 6000 pounds per square inch.

The transition metals useful in the process of this invention are those having atomic numbers from 21 through 28 inclusive; 39 through 46, inclusive; and 72 through 78 inclusive. The rare earth metals useful in the process of this invention are those having atomic numbers from 57 through 71, inclusive. A preferred group of transition metals comprises vanadium, chromium, manganese, iron, cobalt and nickel; these dopant elements impart highly desirable color characteristics to gemstone crystal products of this invention. A preferred group of rare earth metals comprises neodymium, samarium, gadolinium and europium because these dopant elements impart particularly desirable optical properties to crystals for use in solid state devices.

Since the process of this invention is a hydrothermal process which is conducted at elevated temperatures and pressures, the process is most easily conducted in a sealed reaction vessel, autoclave or bomb of a type well known in the hydrothermal art of crystal synthesis. A variety of these reaction vessels are commercially available and are highly suitable for use in practice of this invention. The reaction vessel which is employed should be constructed of a high strength, corrosion-resistant steel in order to withstand the pressures and temperatures encountered in the present process. One such suitable material is a nickel alloy of a high-strength, stainless steel. The reaction vessel may also be provided with a liner or capsule of a noble metal, such as silver, platinum or gold in order to avoid corrosion of the vessel by the acidic medium which is employed in the process of this invention. Several designs for high pressure reaction vessels are suitable for use in conducting the process of this invention, for example, those described by A. A. Ballman and R. A. Laudise ["Hydrothermal Growth," The Art and Science of Growing Crystals (1963), pp., 232–235], and a gold-lined or platinum-lined bomb similar to the that described by Morey in Amer. Miner., vol. 22, p. 1121 (1937). The bomb or capsule should remain tightly sealed throughout the reaction period in order to maintain the optimum conditions for satisfactory growth and crystal clarity.

The silicon, beryllium and aluminum oxide nutrients which are present in the aqueous acidic reactant mixture are usually present in the form of hydrous oxides of these metals. Any convenient source of the oxides of silicon may be employed as a starting material, such as for example, optical grade quartz crystal, fused quartz, $SiO_2$ porous glass and the like. The use of optical grade quartz crystal is preferred. Similarly as a source for the oxides of aluminum one may employ materials such as sapphire, gibbsite $(Al_2O_3 \cdot 3H_2O)$, aluminum hydroxide which has been precipitated from solutions of aluminum salts such as aluminum nitrate and the like. Convenient sources of the oxides of beryllium are materials such as beryllium hydroxide $[Be(OH)_2]$, beryllium oxide, and the like. Although the composition of the reactant mixture with respect to the oxides of silicon, beryllium and aluminum may vary over a wide range, a reactant mixture containing these oxides in amounts which closely approximate the stoichiometric amount of these oxides in the composition of the ideal beryl crystal $$(3.0 BeO \cdot 1.0 Al_2O_3 \cdot 6.0 SiO_2)$$

is preferred.

When doped beryl crystals are prepared according to the present process, the source of the transition metal or rare earth metal ion dopant which is present in the reactant mixture is a metal compound such as a transition metal or rare earth hydroxide, a transition metal or rare earth metal nitrate, a transition metal or rare earth metal oxide, a transition metal or rare earth metal chloride, a transition metal or rare earth metal sulfate and the like. The source of the metal ion dopant may also be the reaction vessel itself. For example, in the case where an unlined, nickel-alloy, stainless steel reaction vessel is employed, the bomb material may supply ions such as iron and nickel ions.

Although it theoretically should be possible to incorporate over 10% by weight of a transition metal or a rare earth metal ion dopant into the beryl structure, lower weight percentages of dopant are normally incorporated into the beryl crystal by the process of this invention. Depending primarily on the requirements dictated by the particular end use of the crystal being grown, the concentration of transition metal or rare earth metal ion dopant in the crystal product may vary from about 0.005 weight percent to about 8 weight percent, based on the total weight of the crystal. 0.01 weight percent to 2 weight percent is preferred. When the dopant ion is chromium, a concentration of 0.1 to 2 weight percent is particularly preferred.

In order to provide an amount of transition metal or rare earth metal ion dopant sufficient to produce crystals containing dopants in amounts within the ranges of percentages set forth above, the reactant mixture should contain a metal ion concentration of from about 0.01 weight percent to about 11 weight percent, based on the weight of beryl equivalent to oxide in the nutrient of aluminum, silicon and beryllium in the initial charge. Preferably, the concentration of transition metal or rare earth metal ion from the compound is from 0.01 weight percent to 2 weight percent, based on the theoretical weight of beryl from the oxide sources. More than one transition metal or rare earth metal ion may be used simultaneously as a dopant in the initial charge.

Another essential component of the aqueous reactant mixture of the process of this invention is an acidic halide medium selected from the class consisting of alkali metal halide and an ammonium halide. In the absence of the acidic halide medium, little or no growth of crystals of beryl structure occurs. The preferred acidic halide media are alkali metal halides such as sodium chloride and ammonium halides such as ammonium chloride. The use of ammonium chloride is particularly preferred.

Although the concentration of the halide which is employed may be varied over a wide range, the limits of this concentration appear to be dependent on a number of factors such as the pressure and temperature at which the reaction is conducted, the over-all composition of the reactant mixture, the initial pH of the reactant mixture, and the halide which is employed. When ammonium chloride is employed, concentrations of less than 0.1 N ammonium chloride do not provide a satisfactory system. Concentrations of ammonium chloride as high as 11 N have been employed with good results. Systems which have provided highly satisfactory results are reactant mixtures containing 1 N to 7 N ammonium chloride. Mixtures containing 5 N ammonium chloride are particularly preferred.

In addition to the presence of the necessary halide, it is essential to practicing the process of this invention to provide a reactant mixture which initially has a pH at 25° C. of less than 7. Although an initial pH of from 0.2 to 4.5 is preferred, the pH has been found to be somewhat dependent on the temperature at which the reaction is conducted. At a temperature of 500° C. the growth rate decreases considerably when the initial pH at 25° C. is appreciably below 3, and the crystals which are cloudy and of poor quality are obtained when the initial pH at 25° C. is above 5. However, when the reaction temperature is increased to 600° C., for example good growth rates were observed and high quality crystals were obtained at initial pH's at 25° C. which were as low as 0.2.

When the source of the transition metal ion dopant or the rare earth metal ion dopant is an ionic material which readily hydrolyzes in solution to provide an acidic mixture, further adjustment of the pH may not be necessary. For example, when a sufficient amount of the hydrate of chromic chloride is employed as a source of chromium ion dopant, the hydrolysis of the chromic chloride and the ammonium chloride which is present are usually sufficient to provide a pH within the preferred range set forth above. The pH of the reaction mixture may be adjusted with a mineral acid such as HCl in an amount sufficient to provide a pH within the desired range.

It has also been found that when chromium is being used as the dopant ion, it is highly desirable that the acidic aqueous reactant mixture should be substantially free of fluoride ion, in order to avoid precipitation of metal fluorides such as chromium fluoride which are insoluble and form precipitates under the acidic conditions of the present process. The presence of insoluble metal fluoride salts causes inclusions and cloudiness in the resulting crystals which are obtained, hinders the incorporation of the chromium ion dopant into the crystal except as occluded particles, and affects the rate of growth adversely.

In practicing the process of the present invention the synthetic beryl or doped beryl is grown on a seen crystal located within the sealed reaction vessel. The nutrient oxides and dopant ions migrate to the region of the seed, and new growth crystallizes thereon. Although any crystal having the structure of beryl or other suitable substrate may be used as a seed, a seed crystal of natural or synthetic beryl or a beryl analog is usually employed. Normally, the reaction is continued until the new growth is thick enough to be cut from the original seed. This new growth may then be employed as a seed crystal in further subsequent reactions. In this way macro-crystals of beryl structure of only synthetic hydrothermal origin are obtained. This is particularly useful in preparing macro-crystals of beryl structure having high purity and uniform composition and structure. Large synthetic crystals may also be obtained by conducting a series of short-term runs wherein fresh oxide nutrient and solution are used in each run of the series. A highly favorable aspect of this invention is the ability to achieve and maintain favorable growth rates over extended periods of time. For example, an average growth rate of greater than 0.2 mm. per day in the length of an edge of a crystal has been maintained over a period of 5 days, and an average of as high as 0.1 mm. per day has been maintained over a period of 30 days.

Another favorable aspect of this invention is the ability to substantially confine growth of crystal having the structure of beryl to the seed, and to obtain single crystal growth on said seed or seeds which is substantially flawless and optically transparent. Spontaneous nucleation and twinning on the surface of the seed are eliminated.

Although the condition of the surface of the seed crystal which is employed may influence the rate of growth of new material on the seed, it has been found that the rate of growth on the sawed faces of a seed crystal is about the same and in some instances better than the rate of growth observed on a fractured face of a seed crystal. However, the growth rate is somewhat dependent on the axial orientation of the seed face upon which the new growth is being deposited and the oxide sources which are being employed. When powdered beryllium hydroxide and powdered aluminum hydroxide are employed, growth is fastest on faces cut at approximately 45° to the crystallographic c-axis, and the rate of growth decreases as the face approaches a position parallel to the c-axis or a position perpendicular to the c-axis. Favorable growth rates are obtained on faces cut within the range of 10° to 60° of the c-axis. Using the process of this invention, growth rates of greater than 0.2 mm. per day in the length of an edge of the crystal have been achieved.

The present process for growing crystals having the structure of beryl is conducted at temperatures of from about 425° C. to about 800° C. and at pressures of from about 6000 pounds per square inch to about 30,000 pounds per square inch. Although it may be difficult to determine with absolute accuracy the actual operating pressure for the high-pressure systems employed in the present process, the internal pressure within the reaction vessel can be calculated from known pressure-temperature-volume data on water when low concentrations of solutes are present. Knowing the volume of the reaction vessel, the volume of the reactant mixture and the reaction temperature, the reaction pressure can be most conveniently calculated by using the pressure-temperature-volume data for pure water published by G. C. Kennedy in American Journal of Science, vol. 248, p. 540 (1950). However, since the presence of high concentrations of solutes lowers the pressure of the system somewhat from that of pure water, the effect of 5 N $NH_4Cl$ was determined by making actual measurements at various temperatures using small bombs which contained a 5 N $NH_4Cl$ solution. The following table lists several corrected values for two percentages of fill:

| | Corrected pressure in pounds per square inch at 62% fill | Corrected pressure in pounds per square inch at 73.5% fill |
|---|---|---|
| Temperature in degrees centigrade: | | |
| 417 | | 6,370 |
| 423 | 5,290 | |
| 447 | | 8,670 |
| 464 | 7,260 | |
| 473 | | 11,350 |
| 497 | 9,780 | |
| 508 | | 15,750 |
| 538 | | 20,400 |
| 555 | 14,900 | |
| 621 | 20,800 | |

It should also be understood that the upper limits of temperature range and particularly the pressure range are dependent to a great degree on the equipment which is available, and that these upper limits might be extended if equipment could be designed to withstand the higher temperatures and pressures. With the equipment which is presently available, the reaction temperature is from abount 425° C. to about 800° C., and the pressure is from about 6000 pounds per square inch to about 30,000 pounds per square inch. A temperature of from 475° C. to 650° C. and a pressure from 9000 pounds per square inch to 21,000 pounds per square inch is preferred.

It has also been found that the growth rate may be accelerated somewhat by maintaining a temperature differential between the upper and lower portions of the reaction vessel or bomb. This differential may be achieved by providing a separate heating element for the lower portion of the reaction vessel or bomb, and then positioning the reaction vessel and the heating element in a large furnace which is maintained at a temperature which is lower than that produced by the heating element. In this manner, a temperature differential is easily maintained by suitable control of the bomb and the furnace heaters. A temperature differential between the top and the bottom of the reaction vessel of from about 10° C. to about 100° C. may be employed. A differential of from 10° C. to about 20° C. is preferred.

It has also been found that the rate of growth may be affected by the geometry of the seed crystal and the oxide nutrient sources within the reaction vessel. For best results the seed crystal should be positioned at a point in the reaction vessel which is intermediate to the zone wherein the silica source is located and zone wherein the beryllium oxide and aluminum oxide sources are located. Throughout the reaction the seed crystal and all of the oxide sources are in intimate contact with the acidic aqueous reactant mixture. The relative distances between the silicon oxide source, the seed crystal or crystals, and the beryllium and aluminum oxide sources have not been found to be critical. An arrangement which has been found to be highly suitable for growing single crystals of good quality at relatively high growth rates is one in which the oxide sources of beryllium oxide and aluminum oxide are placed at the bottom of the reaction vessel, the silicon oxide source is suspended by means of a wire or a porous gauze basket of noble metal in the upper portion of the reaction vessel, and the seed crystal or seed crystals are suspended by means of a noble metal wire at a point in between.

It is also possible to employ multiple groups of oxide sources and seed crystals within a reaction vessel wherein individual sets of oxide sources and seeds are "stacked" in separate arrangements within said vessel and all are in contact with a common acidic aqueous reactant mixture. The number of sets which may be employed is determined primarily by the available volume of the reaction vessel. The "stacked" system is not a preferred method for carrying out the process of this invention.

When crystals prepared according to the process of this invention are removed from the reaction vessel after it has cooled, the surfaces of these crystals may be covered with other phases or impurities which formed within the autoclave during cooling. Although these phases or impurities are not substantial in quantity, any impurities may be removed before use of the crystal product as a gemstone or in a solid-state device by washing with hot or cold dilute acid solutions and water or by scraping the surfaces clean.

An analysis of a typical sample of a chromium-doped beryl product prepared by the process of this invention is as follows:

| | Wt., percent | Moles |
|---|---|---|
| $SiO_2$ | 64.9±0.5 | 6.51 |
| $Al_2O_3$ | 16.9±0.3 | 1.00 |
| BeO | 15.0±0.5 | 3.62 |
| $H_2O$ | 1.0±0.5 | 0.34 |
| Cr | 1.07 | 0.12 |

Typically, several other single crystals of chromium-doped beryls prepared by the process of this invention were found to contain 0.26%, 1.1% and 1.07% by weight of Cr.

The crystals prepared by the process of this invention were found to differ from the ideal stoichiometry for beryl, $3.0BeO \cdot 1.0Al_2O_3 \cdot 6.0SiO_2$, as can be seen from the typical analysis set forth above.

Properties of the chromium-doped crystals prepared by the process of this invention have been found to differ significantly from those reported in the literature for chromium-doped beryls such as natural emeralds and synthetic emeralds. By comparing all of the properties shown in the accompanying Table I for natural and synthetic emeralds with those of the chromium-doped beryl crystals of this invention, one can readily distinguish crystals of this invention from both natural emeralds and synthetic emeralds.

TABLE I.—COMPARISON OF PROPERTIES OF CRYSTALS

| Crystal | Specific gravity | Mean refractive indices | Fluorescence behavior Long wave [1] U.V. | Short wave [2] U.V. | Intensity through Chelsea filter [3] Low scale | High scale |
|---|---|---|---|---|---|---|
| Natural emeralds | 2.69–2.77 | 1.57–1.58 | None to pale red to red | None to pale red | N.D. | N.D. |
| Natural Columbian emerald (0.2% Cr) | 2.70 | 1.57 | None to pale red | do | <2 | N.D. |
| Chatham synthetic emerald | 2.65–2.66 | 1.56 | Deep red | Deep red | 8–14 | 39 |
| Lechleitner synthetic emerald overlay on a Brazilian beryl ("Emerita") | 2.65–2.71 | 1.58 | Pale red to red | Pale red to red | 8 | 11 |
| Cr-doped beryl of this invention | 2.66–2.71 | 1.57–1.58 | Brilliant red | Brilliant red | | |
| (a) Rough, 1.0% Cr | | | | | 19–30 | 76–120 |
| (b) Rough, 0.8% | | | | | 13–25 | N.D. |
| (c) Faceted stone, 1% Cr | | | | | 25 | 42–82 |
| Synthetic ruby (0.05% Cr) | 4.0 | 1.77 | Brilliant red | Brilliant red | N.D. | 270–300 |

[1] 3,650 A.
[2] 2,537 A.
[3] Chelsea filter: A dichromatic filter, transmitting in the deep red near 6,900 A., and in the yellow-green near 5,400 A., used to distinguish emeralds; see R. Webster, "Gems," vol. II, Butterworths, p. 570 (1962). The exciting radiation was an ultraviolet lamp, 2,537 A.; fluorescence intensity was measured with pinhole optics, normal to direction of exciting beam, through Chelsea filter, detected with photomultiplier tube in microdensitometer apparatus; approximate incident radiation intensity of U.V. lamp was 50 milliwatts/sq. ft.
NOTE.—N.D.=Not determined.

For example, although natural emeralds exhibit values of refractive index and specific gravity similar to those of Cr-doped beryl crystals of this invention, the fluorescence behavior of the former is significantly different from that of the latter. Similarly, although the synthetic Chatham emerald (believed to be a flux-grown material) shows a strong fluorescent intensity, Cr-doped beryl crystals of this invention can readily be distinguished from the Chatham product on the basis of the respective refractive index and specific gravity values. It has been found that the fluorescence behavior of Cr-doped crystals of this invention is a particularly distinguishing characteristic thereof. As can be seen from Table I, the relative fluorescence intensity values, measured through the Chelsea filter, for Cr-doped beryl crystals of this invention are as much as about ten times as large as those values measured for the natural and synthetic emeralds listed. Also on a visual basis under the radiation from a standard laboratory ultraviolet lamp (long or short wavelength) Cr-doped beryl crystals of this invention exhibited a distinct brilliant red fluorescence substantially more intense than the fluorescence level exhibited by the natural and other synthetic emeralds tested. This fluorescence can also be excited by incident radiation in the visible violet and blue region. Differences in refractive index, specific gravity and fluorescence behavior are means readily recognized and used by those skilled in the art to distinguish crystals, particularly in the field of gemstones and solid state materials. By way of comparison, Table I also includes data on the fluorescence behavior of a ruby crystal. Ruby exhibits the most intense red fluorescence of all known crystals, and such behavior is usually indicative of a utility in solid state applications, as in a laser device. It is seen that the fluorescence intensity values for Cr-doped beryl crystals of this invention are surprisingly good in relation to the value listed for ruby.

Another distinguishing characteristic of the crystals produced by the process of this invention is their infrared spectrum. All of the crystals produced by the present process are characterized by a strong absorption band in the OH-strength region near 3700 reciprocal centimeters and the absence of a strong band in either of the absorption region (a) near 3600 reciprocal centimeters and (b) between about 1600 and about 1650 reciprocal centimeters. The infrared spectra of the crystals of this invention are measured by conventional techniques employed on powdered solids, for example, KBr wafer or mull methods. This characteristic infrared spectrum makes it possible to distinguish crystals produced by the process of this invention from natural beryl and beryl analogs. For example, natural emeralds also show a strong absorption band at 3700 cm.$^{-1}$ but, in addition, have a strong band between 1600 and 1650 cm.$^{-1}$ and often a strong band near 3600 cm.$^{-1}$.

The crystals of this invention can also be distinguished from any type of flux grown beryl or beryl analog because the crystals of this invention have high quality and a lack of flux inclusions, and because flux-grown beryl and beryl analogs have infrared spectra devoid of any significant absorption bands characteristic of hydroxyl groups. Additional distinguishing properties are refractive index, birefringence and specific gravity as shown in the following Table II.

TABLE II

| | Flux-grown chromium-doped beryl | Hydrothermal grown chromium-doped beryl |
|---|---|---|
| Refractive index range | 1.56–1.57 | 1.57–1.58 |
| Birefringence | 0.003–0.005 | .005–0.006 |
| Specific gravity | 2.66–2.67 | 2.66–2.71 |

The process of this invention typically produces tabular shaped crystals bounded by dipyramid and prism faces. Natural and flux-grown beryl and doped beryl crystals have the shape of hexagonal prisms. This difference in morphology is believed to be caused by variation in growth rate along specific crystallographic directions.

Thus, the combination of chemical and physical properties of the crystals of this invention, including size, optical quality, infrared spectrum, fluorescence characteristics, specific gravity and refractive index, make it possible to distinguish crystals of this invention from natural beryl and its natural analogs and from other synthetic beryls and beryl analogs.

A particular advantage of the single crystals of beryl structure of this invention is the utility of the doped crystals in solid-state applications. Such applications often require that the crystal be free of crystal imperfections and contain only a controlled amount of dopant ion or ions homogeneously distributed throughout the crystal structure and be substantially free of undesirable extraneous impurities, such as flux inclusions. Naturally-occurring crystals of beryl structure such as emeralds almost always contain at least small amounts of several impurity ions. In addition, the level of extraneous ions is often considerably out of the range desired for solid-state applications.

Following are examples of the practice of the invention which is hereinbefore described.

EXAMPLE I 0.36 gram of gibbsite ($Al_2O_3 \cdot 3H_2O$) and 0.31 gram of powdered beryllium hydroxide were placed at the bottom of a gold-lined reaction vessel, and 0.90 gram of crushed quartz crystal were suspended in a platinum bucket in the upper portion of the vessel. 0.273 gram of $CrCl_3 \cdot 6H_2O$ was added to provide chromium ion dopant, and two natural beryl seed crystals weighing 0.1695 gram and 0.0651 gram were suspended in the reaction vessel between the silica source and the alumina beryllia source. The vessel was then filled to 62% of its capacity with 9.3 cc. of an aqueous solution of 0.1 N $NH_4Cl$ and 0.1 N NH₄OH. The initial pH of the resulting reactant mixture was 2.85 at 25° C. The reaction vessel was sealed, and an auxiliary furnace was attached to the bottom of the reaction vessel in order to maintain a temperature differential between the top and the bottom of said vessel. The vessel with the auxiliary furnace attached was placed in a larger furnace and heated to 475° C. The top of the reaction vessel was maintained at a temperature of 475° C. while the bottom of the vessel was maintained at a temperature of 500° C. through use of the auxiliary heater which was attached. The resultant pressure within the reaction vessel was approximately 20,000 pounds per square inch. After six days the vessel was removed from the larger furnace, quenched with water until cool, and opened. The seed crystals were removed from the reaction vessel, washed, and dried. Upon weighing, the seed crystals were found to have gained 9.2% and 6.0% respectively in weight. The new growth was clear green in color (about 2 wt.-percent Cr) and examination of this new growth under high magnification indicated that chromium had entered the crystal as a structural component. Measurements of the new growth showed average linear growth rates in an edge of a crystal 0.019 mm. per day and 0.010 mm. per day, respectively.

EXAMPLE II 0.53 gram of gibbsite, 0.46 gram of powdered beryllium hydroxide, 1.43 grams of crushed optical quartz crystal, and 0.41 gram of $CrCl_3 \cdot 6H_2O$ were placed in a gold-lined reaction vessel in a manner similar to that set forth in Example I. Four seed crystals of natural beryl ranging in weight from 0.0800 to 0.1157 gram were suspended between the quartz and the gibbsite-beryllium hydroxide mixture, and the vessel was filled in 62% of its capacity with 9.3 cc. of an aqueous solution of 0.1 N NH₄Cl and 0.1 N NH₄OH. The initial pH of the resulting reactant mixture was 2.8 at 25° C. the reaction vessel was sealed, placed in a furnace, and heated to 500° C., at which the internal pressure was 20,000 pounds per square inch. After 6 days the vessel was removed from the furnace, quenched until cool, and opened. The seeds had gained from 8.0 to 21.9% in weight and the average linear growth rates ranged from 0.013 to 0.035 mm. per day. The quality of the new green growth (about 2% Cr) was considered excellent.

EXAMPLE III

In order to illustrate the deleterious effect of the presence of fluoride ion when the dopant ion is chromium, a reactant mixture similar to that in Example II was prepared, except that a solution of 0.1 N NH₄F and 0.1 N NH₄OH was used instead of a solution of 0.1 N NH₄Cl and 0.1 N NH₄OH. The initial pH of this reactant mixture was 4.3 at 25° C. After 4 days at 510° C. green growth was observed on all four seeds, but microscopic examination revealed that the new growth was spoiled by numerous inclusions of solid, powderous green particles of $CrF_3$ which was insoluble in the acid medium.

EXAMPLE IV 1.06 grams of powdered aluminum hydroxide, 0.92 gram of powdered beryllium hydroxide, 3.0 grams of crushed crystal quartz and 0.04 gram of $CrCl_3 \cdot 6H_2O$ were placed in a gold-lined reaction vessel in an arrangement similar to that of Example II. Four beryl seed crystals were suspended between the silica source and the alumina-beryllia source, and 8.2 cc. of an aqueous solution of 1.0 N NH₄Cl were added. The initial pH of the resulting reactant mixture was 3.7 at 25° C. After 3.5 days at 520° C. and approximately 20,000 pounds per square inch pressure, the seed crystals exhibited an increase in weight of from 7.4% to 14.0%. The average linear growth rates ranged from 0.020 to 0.034 mm. per day, and the quality of the new growth (about 0.2 weight percent Cr) was considered to be excellent.

EXAMPLE V

Example IV was repeated using a 5.0 N NH₄Cl solution in place of the 1.0 N NH₄Cl solution and three beryl seed crystals instead of four. Initial pH of the reactant mixture was 4.1 at 25° C. Over an 8.5 day period at 515° C. and approximately 12,000 pounds per square inch pressure, the seeds grew at an average linear growth rate of 0.045, 0.046 and 0.052 mm. per day. The new growth (about 0.2 weight percent Cr) was considered to be excellent.

EXAMPLE VI

In a procedure similar to that of Example IV growth was obtained on four beryl seed crystals weighing from 0.024 to 0.104 gram. 1.06 grams of powdered aluminum hydroxide, 0.92 gram of powdered beryllium hydroxide, 3.0 grams of crushed crystal quartz, and 0.06 gram of chromic chloride hydrate were employed, and the reaction vessel was filled to 62% of its volume with 8.93 cc. of a 5 N NH₄Cl solution. The initial pH of the resulting reactant mixture was 3.9 at 25° C. An average reaction temperature of 585° C. was maintained over a five day period. After five days, clear green growth had occurred on all seeds, at average linear growth rates of from 0.112 to 0.322 mm. per day. The quality of the new growth (about 0.3 weight percent Cr) was excellent.

EXAMPLE VII

Example VI was repeated using 7.5 cc. of a 5 N NH₄Cl solution to obtain a 52% fill, and the chromium dopant source of $CrCl_3 \cdot 6H_2O$ was increased by a factor of five (0.3 gram of $CrCl_3 \cdot 6H_2O$ was used). The initial pH of the resultant reactant mixture was 2.7 at 25° C. A reaction temperature of from 590° C. to 620° C. was maintained over a five day period. After five days, a new growth of excellent quality but of a deeper shade of green (about 1.1 weight percent Cr) than that of the previous example was obtained. The average linear growth rate was 0.13 mm. per day.

EXAMPLE VIII

In this run the bomb was of the lens-ring sealed type fabricated from Inconel-X (51.5 cc. volume). A gold crucible (22.4 cc. volume) with screw-on silver caps was used to prevent contamination of the crystal product. The charge consisted of 2.90 grams of aluminum hydroxide, 2.4 grams of beryllium hydroxide, 4.4 grams of crystal quartz and 0.1 gram of $FeCl_3 \cdot 6H_2O$ as the dopant. This nutrient medium was equivalent to 10 grams of beryl with 0.2% Fe. Four beryl seeds, two of which were cut at an angle to the c-axis and two cut at 90°, were used. The hydrothermal medium was 11.0 cc. of 0.1 N NH₄Cl. The initial pH of the resulting reactant mixture was 3.1 at 25° C. After 6 days at 500° C. and about 20,000 p.s.i. pressure, the bomb was cooled and opened. Growth rates ranging from 0.008 to 0.015 mm./day were measured. Growth of new iron-containing beryl was especially smooth on the prism-cut seeds.

EXAMPLE IX 1.06 g. of aluminum hydroxide, 0.92 cc. of beryllium hydroxide and 0.18 g. of $FeCl_3 \cdot 6H_2O$ was placed in the bottom of a Morey bomb and 3.0 g. of crystal quartz in the top. Four seeds varying between .042 and .13 g. were suspended between the oxide nutrients. The bomb was loaded to 55% of fill with 7.9 cc. of 5 N NH₄Cl. The initial pH of the resulting reactant mixture was 2.9 at 25° C. The bomb was sealed and heated at 600° C. and 15,000 p.s.i. pressure for 5 days. The seeds grew at rates between 0.02 and 0.04 mm./day and an analysis of the crystal with its growth layers showed 0.21% Fe.

EXAMPLE X

In a procedure similar to Example IX, the reactant mixture contained 1.06 g. aluminum hydroxide, 0.92 g.

beryllium hydroxide, 3.0 grams of crystal quartz and NdCl₃ (0.01% Nd) as the dopant. 8.8 cc. of 5 N NH₄Cl was added. The pH of the resulting reactant mixture was 5.6 at 25° C. The mixture was adjusted to a final initial pH of 1.65 at 25° C. with 1 N HCl. The sealed bomb was heated at an average temperature of 520° C. for 7 days. The neodymium containing beryl growth on the seeds occurred at a rate between .001 and .007 mm./day.

EXAMPLE XI 8.7 g. of gibbsite, 7.2 g. of berryllium hydroxide, 20.1 grams of crystal quartz and 0.31 g. of $CrCl_3 \cdot 6H_2O$ were placed in a gold crucible together with 27.6 cc. of 20% NaCl solution as hydrothermal medium. Four seeds ranging between 0.028 and 0.334 gram were suspended in the middle of the crucible. The initial pH of the resulting reactant mixture was about 4 at 25° C. The gold crucible was placed in a 150 cc. stainless steel bomb and 37.3 cc. of water added to balance the pressure within the crucible. The sealed bomb was heated at an average temperature of 620° C. for 5.5 days. Chromium containing growth occurred on the seeds at a rate between .004 and .007 mm. per day.

EXAMPLE XII

In a procedure similar to Example IX 1.06 g. of aluminum hydroxide, 0.92 g. of beryllium hydroxide and 0.24 g. of $CrCl_3 \cdot 6H_2O$ was placed in the bottom and 3.00 g. of crystal quartz in the top of a gold lined Morey bomb. Four seeds ranging between 0.20 and 0.33 gram were suspended between the oxide nutrients. 7.2 cc. of 5 N NH₄Cl was added. The initial pH of the resulting reactant mixture was 2.8 at 25° C. The sealed bomb was heated at 605° bottom and 590° top for a 30 day period. Pressure was about 13,500 p.s.i. All seeds grew at about 0.1 mm. per day and approximately 87% of the nutrient was converted to new crystal on the seeds. Analysis of the new chromium containing growth showed 1.1% Cr.

EXAMPLE XIII

A gold crucible was charged with 2.9 g. of aluminum hydroxide, 2.4 g. of beryllium hydroxide, 4.4 g. of crystal quartz, 0.10 g. of $FeCl_3 \cdot 6H_2O$ and 11.0 cc. of 0.1 N NH₄F in 0.1 N NH₄OH. Four seeds weighing between 0.077 g. and 0.081 gram were suspended in the center. The crucible was fitted with a gold screw on cap and loaded into an Inconel X bomb together with 12.0 cc. of water to balance the pressure. The initial pH of the resulting reactant mixture was 3.9 at 25° C. After sealing, this bomb was heated at 520° C. average temperature for 10 days. Growth rates ranging between .003 and .008 mm. per day were observed for the iron containing new growth.

EXAMPLE XIV

Following the procedures of Examples IX and XII and using both $FeCl_3 \cdot 6H_2O$ and $CrCl_3 \cdot 6H_2O$ as sources of dopant ions, the process of this invention gave new growth on seed crystals. Analysis showed the new growth to be high quality doped beryl containing 0.12 weight percent iron and 0.35 weight percent chromium.

Starting with as-grown (i.e. "rough") Cr-doped crystals weighing 1.14 grams and 0.78 gram produced according to the invention, two faceted gems weighing 0.5 carat (0.1 gram) and 0.4 carat (0.08 gram) were cut in a step-faceted style. These faceted gemstones were optically clear and exhibited a brilliant dark emerald-green color.

Chromium-doped beryl crystals of this invention are of a size and quality ideally suited for use in solid-state devices such as lasers and masers. F. E. Goodwin [Journal Applied Physics, 32, 1624–1625, (1961)] reported the successful operation of synthetic emeralds in a single-cavity reflection-type maser amplifier operating at 10 kmc. Goodwin noted that his synthetic emeralds "exhibited a number of imperfections, as was evidenced by microscopic twinning and spontaneous nuclei." He speculated that crystals "relatively free of polycrystalline defects . . . will exhibit narrower line widths and superior maser characteristics." The high degree of single-crystal character and other crystal perfection of the Cr-doped beryl crystals of this invention are capable of providing such desired superior maser characteristics.

Though superior embodiments have been shown and described, it is to be understood that they are illustrative only, and are not to be construed as limiting the scope and spirit of this invention.

What is claimed is:

1. A hydrothermal process for growing single crystals having the structure of beryl which comprises: depositing a composition having the structure of beryl on a seed crystal from an acidic aqueous reactant mixture having an initial pH at 25° C. not above 5 and consisting essentially of: (1) at least a major amount of (a) sources of oxides of beryllium, aluminum and silicon, and (b) a halide solvent medium which consists essentially of water and at least one or more alkali metal halides and/or ammonium halides, and (2) minor amounts of sources of one or more of the dopant metals vanadium, chromium, manganese, iron, cobalt, nickel, neodymium, samarium, gadolinium and europium; said process being carried out at a temperature of at least 425° C. and under a pressure of at least 6000 pounds per square inch.

2. The process in accordance with claim 1 wherein said dopant metal is chromium.

3. The process in accordance with claim 1 wherein said sources of oxides of beryllium, aluminum and silicon are present in amounts which provide substantially the stoichiometric amounts of beryllium, aluminum and silicon oxides in the composition of an ideal beryl crystal (3.0 $BeO \cdot 1.0Al_2O_3 \cdot 6.0SiO_2$).

4. The process in accordance with claim 1 wherein said dopant metal is chromium and said aqueous reactant mixture is substantially free from fluoride ion.

5. The process in accordance with claim 1 wherein said aqueous reactant mixture has an initial pH at 25° C. of from 0.2 to 4.5 and in which said halide is ammonium chloride.

6. The process in accordance with claim 3 wherein (1) said sources of oxides of beryllium and aluminum are disposed near the bottom of a closed reaction vessel, said sources of oxides of silicon are disposed near the top of said vessel, and said seed crystal has the structure of beryl and is supported between said sources of oxides of beryllium and aluminum and said sources of oxides of silicon, and (2) wherein the temperature at the bottom of said reaction vessel is at least 10° C. higher than the temperature at the top of said vessel.

7. The process in accordance with claim 5 wherein said aqueous reactant mixture is substantially free from fluoride ion and wherein said source of dopant metal is $CrCl_3 \cdot 6H_2O$ which is present in said reactant mixture in sufficient amount to supply from 0.01 to 2 weight percent chromium ion in said crystal based on the weight of ideal beryl crystal theoretically equivalent to the weight of aluminum, beryllium and silicon oxides present in said oxide sources.

8. The process in accordance with claim 7 wherein said source of beryllium oxide is powdered beryllium hydroxide, said source of aluminum oxide is powdered aluminum hydroxide, said source of silicon oxide is crushed quartz, said halide solvent medium is 5 N ammonium chloride, and wherein the temperature at the bottom of the vessel is between 475° C. and 650° C. and the pressure is between 9000 and 21,000 pounds per square inch.

9. The process in accordance with claim 8 in which said seed crystal has a face cut thereon within an angle of from 10° to 60° with the c-axis of the crystal.

(References on following page)

References Cited

UNITED STATES PATENTS

| | | | |
|---|---|---|---|
| 2,680,677 | 6/1954 | Broge et al. | 23—301 |
| 3,234,135 | 2/1966 | Ballman et al. | 252—62.58 |

OTHER REFERENCES

Chemical Abstracts, vol. 41, p. 6840h, October 1947.
Corwin: "J. of Chem ed.," vol. 37, No. 1, January 1960.
Kerr et al.: "Bulletin of Geological Soc. of America," vol. 54, suppl. Apr. 1, 1943, pp. 14, 17, 18, 21, 24 and 30.

Kroger: "Some Aspects of the Luminescence of Solids," Elsevier Pub. Co., 1948, pp. 266, 269, 275, 293.
Herbert Smith Memorial Lecture, "Journal of Gemology," vol. 8, 1961, pp. 88–95.

TOBIAS E. LEVOW, Primary Examiner

J. COOPER, Assistant Examiner

U.S. Cl. X.R.

23—110, 301, 305; 106—42; 252—62.59, 62.62, 301.4F

UNITED STATES PATENT OFFICE
CERTIFICATE OF CORRECTION

Patent No. 3,567,643         Dated  March 2, 1971

Inventor(s)  E. M. Flanigen and N. R. Mumbach

It is certified that error appears in the above-identified patent and that said Letters Patent are hereby corrected as shown below:

Column 1, line 58, delete "the", first occurre[nce]

Column 2, line 6, change "are" first occurrenc[e to]
-- art --.

Column 2, line 49, delete "a".

Column 4, line 53, delete "the".

Table I, fourth line of footnote 3, delete "apparatus!".

Column 9, line 60, change "strength" to -- str[ength]

Column 14, line 9, change "superior" to -- spe[cific]

Column 14, line 54 (first line of claim 7), chan[ge] "5" to -- 6 --.

Signed and sealed this 20th day of July 1971.

(SEAL)
Attest:

EDWARD M. FLETCHER, JR.
Attesting Officer

WILLIAM E. SCHUYLER, JR.
Commissioner of Patents